United States Patent [19]
Doublet et al.

[11] Patent Number: 5,486,928
[45] Date of Patent: Jan. 23, 1996

[54] METHOD FOR MANUFACTUING A STAMP TO EMBOSS WIRE CLOTHS IN ORDER TO MAKE WATERMARKS AND EQUIPMENT TO IMPLEMENT THIS METHOD

[75] Inventors: Pierre Doublet, Jouy sur Morin; Claude Passebecq, Paris; Etienne Bigot, Jouy sur Morin, all of France

[73] Assignee: Arjo Wiggins S.A., Paris, France

[21] Appl. No.: 934,452

[22] PCT Filed: Mar. 12, 1991

[86] PCT No.: PCT/FR91/00202

§ 371 Date: Sep. 14, 1992

§ 102(e) Date: Sep. 14, 1992

[87] PCT Pub. No.: WO91/14217

PCT Pub. Date: Sep. 19, 1991

[30]     Foreign Application Priority Data

Mar. 13, 1990 [FR] France ................................... 90 03415

[51] Int. Cl.$^6$ ................................ H04N 1/21; H04N 1/23
[52] U.S. Cl. ........................................................... 358/299
[58] Field of Search ............................................. 358/299

[56]         References Cited
U.S. PATENT DOCUMENTS

| | | | |
|---|---|---|---|
| 4,178,598 | 12/1979 | Erlichman | 358/299 |
| 4,385,360 | 5/1983 | Yamada et al. | 364/514 |
| 4,575,805 | 3/1986 | Moermann et al. | 364/474 |
| 4,970,600 | 11/1990 | Garnier et al. | 358/299 |
| 4,972,323 | 11/1990 | Cauwet | 364/474.29 |
| 5,088,864 | 2/1992 | Yanagida | 358/299 X |

*Primary Examiner*—Peter C. Wong
*Assistant Examiner*—Randy W. Gibson
*Attorney, Agent, or Firm*—Bacon & Thomas

[57] ABSTRACT

A new process for making an embossing punch comprises the steps of: (a) the values of an image are put into numeric form; and, (b) the punch is automatically and directly engraved. The numeric image is converted into continuous control values for a path of an engraving tool over a continuous surface and the level curves of said surface are plotted to provide the continuous engraving path. One possible application is embossing fabrics for the manufacture of watermarked paper.

21 Claims, 1 Drawing Sheet

METHOD FOR MANUFACTUING A STAMP TO EMBOSS WIRE CLOTHS IN ORDER TO MAKE WATERMARKS AND EQUIPMENT TO IMPLEMENT THIS METHOD

The present invention concerns a method for manufacturing a stamp to be used in embossing the wire cloths of a papermaking machine, for instance a wire cloth suitable to make watermarks. The stamp may be in the form of a tool with which to directly emboss the wire cloth or it may be a master stamp used to directly make other stamps by electroforming.

The invention also concerns the equipment with which to implement such a method.

Watermarked paper, for instance fiduciary paper, in particular for banknotes and for deluxe letterhead, is made in a round form, or in a Fourdrinier machine which conventionally comprises several wire mesh cloths which are superposed and allow drip-draining the cellulose-fiber suspension from which the paper is made. As a rule two cylindrical wire cloths are used that comprise depressed and/or raised embossings to achieve variable fiber densities as a result of which watermarks are achieved.

As a rule the wire-cloth embossing is made by an embossing tool or stamp which is made from copper or nickel, in general by electroplating.

When it is desired to reproduce a drawing in the form of a watermark, an artist makes a rendering of the drawing. Next, the artist makes a wax engraving of this drawing. Such an engraving may take fifteen days of the watermark-artist's time. Next a replica of the wax engraving is made from a polymerizable material. Then the replica is rendered conductive and immersed into an electroplating bath to obtain a matching design and lastly a copper or nickel stamp is electroformed.

Such manifold operations obviously are lengthy and delicate.

Accordingly attempts have been carried out in the prior art to stamp wire cloths of a round form by spark or electro-erosion machining. Such a procedure is described in the European patent application EP A 252,842 filed by Banque de France. In this document, a steel tool is made with which to emboss wire cloth forms of a round form using an electrode for electro-erosion. This electrode is engraved by machining plane after plane. This is a graphite electrode and the machining is level by level. Illustratively, to achieve an engraving depth of 20 mm by this procedure, forty passes are needed. Accordingly, to achieve an engraving depth down to 20 mm, a machining time of about 60 hours will be required.

Therefore any procedure to solve the problem of long manual operations when making a steel tool will only partly achieve its objectives.

Moreover and as mentioned in this document, a part is used which is made of graphite, and is hence fragile.

The electro-erosion technique entails using a dielectric liquid, for instance a very fluid oil of low volatility and having a high flash point. This is kerosene.

In said procedure, furthermore, the distance between the electrode and the part being machined must be kept at the dielectric thickness which the electric discharges can cross. Maintaining this specific distance between electrode and part may render both the procedure and the equipment complicated.

The Canadian patent 1,003,049 describes a manufacturing procedure for a metal badge made by electro-erosion. This badge is planar, that is, two-dimensional. The European patent document EP A 252,842 describes a means for making a three-dimensional graphite electrode. This means consists in engraving along several planes that are increasingly deeper. Thus a first engraving pass is carried out, then a second, then the nth. This is discontinuous engraving.

European patent application EP A 273,826 describes an automated engraving procedure for small ornaments or small tools. The object of this procedure is to faithfully show the distinctive features of a given subject. This procedure consists of the following:

the image of the particular subject is sweep-analyzed,
primary series of digital signals are generated,
the primary series are processed to generate secondary series of signals representing the engraving to be made in such a manner that sequences of digital signals shall be generated that control the relative displacements of an outline and of an engraving tool with three displacement axes X, Y and Z, said secondary series consisting of binary signals, two contiguous binary signals defining an original segment of a line to be engraved.

On one hand the series of displacement control-signals comprise double pulse sequences controlling horizontal displacements and on the other hand a discontinuous pulse sequence controlling elementary vertical displacements determining the engraving depth.

The drawback of such a procedure is that it permits faithful representation only of a specific subject. Moreover, use is made of binary series that entail complex and long processing. Lastly engraving takes place discontinuously. In fact, engraving is effected plane by plane.

The object of the invention is to overcome these drawbacks.

A first object of the invention is to avoid the electro-erosion technique and hence eliminate the intermediate graphite electrode, as a result of which no dielectric liquid is necessary. Thus, there is no need to regulate the distance between the stamp and the electrode.

A second object of the invention is to manufacture a stamp much more rapidly than do the procedures of the prior art.

A third object is to provide a method which, starting from a drawing, sketch, graphic elements or a photograph, allows automatic reproduction of them, including being able to reduce them in size, to enlarge them, to invert them, to reproduce their contrasts, to simplify them, to make caricatures of them, to define anamorphic contours, etc., and to obtain a larger or smaller stamp of the desired shape.

A fourth object of the invention is to make an embossing means constituted by a stamp or a mould and die.

To these ends, the invention concerns a method for manufacturing an embossing stamp for making watermarking wire cloths, in particular wire cloths for the so-called "round form" papermaking machines or wire cloths for Fourdrinier machines, whereby an image is sensed and its values are digitized, said values comprising the values of the position-dots of the image and the values of the grays of the image dots, characterized in that a continuous three-dimensional surface is associated with the digital image values in relation to elevation contour lines, the elevation contour lines are processed into control values of the path of an engraving tool, said path being continuous, the stamp is engraved in automated manner.

Accordingly the method of the invention amounts to associating the digital image with a continuous three-dimensional surface, for instance along elevation contour lines.

The method of the invention is remarkable in that an intermediary electrode is not engraved plane after plane, but that the stamp is engraved directly, the engraving path being continuously controlled.

Therefore the method of the invention consists in transforming a digital image into a continuous surface from which is obtained a continuous tool path. Thus the digital volume is associated with a continuous surface covering this volume.

The elevation contour lines so obtained determine the tool path.

In a preferred embodiment of the invention, and following the first stage (a), the values of the digitized image are used to reconstitute and display an image of level-dots of variable grays and the image so displayed is translated to obtain a desired image and the corresponding values. The translated image may optionally be printed in black-and-white or in color.

The fact that the image is displayed, for instance on a computer monitor, and that it can be modified and interpreted, leads to a very substantial advantage: the method of the invention serves to engrave a stamp which then is used to emboss watermarking wirecloths. Now it is well known to the person of skill in the art that in order to achieve a proper watermark, the shape of the stamp must be different from the shape of the watermark: the watermark is made when the sheet of paper is being made. This sheet is manufactured in a conventional manner from an aqueous dispersion of cellulose or other natural or synthetic fibers, of binders and of various fillers. Next the dispersion is placed on a wire mesh and dewatered, compressed and lastly it is dried. Because of the embossing of the wire cloth, the watermark appears on account of a change in the fiber density where the wire cloth is embossed. The sheet of paper, when as yet not dried, is moved, for example, in the longitudinal direction of the wire cloth in the case of a Fourdrinier machine. This displacement causes a deformation in the direction of the "machine". Therefore the watermark is slightly deformed and no longer matches the shape of the stamp.

Furthermore several, different interpretations of a same initial image will be frequently desired. Lastly, sometimes it is desired to add text near the image. Also, two inverted and strictly symmetrical images may be desired.

Preferably the contrasts and the genuine or false colors are digitized, made anamorphic, interpreted, and/or the contours of the initial image are caricatured.

Preferably, all of the parts of the drawing, text or image may be created and their values digitized and made to correspond to those surface numerical values that represent the engraving-tool path.

In one embodiment of the invention, digitizing and engraving take place in different time intervals.

It is clear that such a method permitting the engraving of a stamp in accordance with a given image while simultaneously creating another image still further accelerates the method of the invention.

Whether the image be interpreted or not, its digital values can be memory-stored. Preferably the values of the elevation contour lines are memory-stored. The values of an already extant image may be used or an image may be fabricated in toto. In this method, the image values are three-dimensional.

Moreover the method of the invention consists in transforming the values of the pixel digital images into a grid of dots defined in X, Y coordinates and in Z elevation, these dots being associated with the pixel gray levels.

Again this method allows associating the X, Y, Z dot grid with a smoothed and continuous surface. The contour curve is obtained by smoothing.

The hues of the X, Y, Z image can be modified by compression, expansion or by setting thresholds in order to exaggerate contrast.

Parts shifted relative to each other by a selected quantity can be made by rolling a ball of a selected diameter to achieve a new surface from an earlier one. Accordingly a first part may be made that shall constitute the stamp proper and a second part which is offset in its shape from the first one and which shall be the die. The wire cloth shall be embossed between stamp and die offset by the thickness of the wire cloth.

Moreover the invention concerns equipment with which to implement such a method.

The manufacturing equipment of an embossing stamp of the invention comprises:

(a) means for detecting and digitizing image values that comprise the values of image-dot locations and the values of the grays of the image dots, (b) means for associating a continuous three-dimensional surface with the digital image values and means for plotting the elevation contour lines of this continuous surface, (c) means to process the elevation contour lines to derive control-values for the path of an engraving tool, said path being continuous, (d) direct and automated stamp engraving means.

Moreover the equipment may comprise means for creating an image, means for modifying the image size, means for creating an image symmetrical with another image.

Furthermore the equipment may include means for displaying the image in black-and-white, color, in two or three dimensions and means for printing such an image.

The description below of illustrative and non-restrictive embodiments of the invention in relation to the attached drawings shall elucidate how the invention may be carried out in practice.

Figure 1:
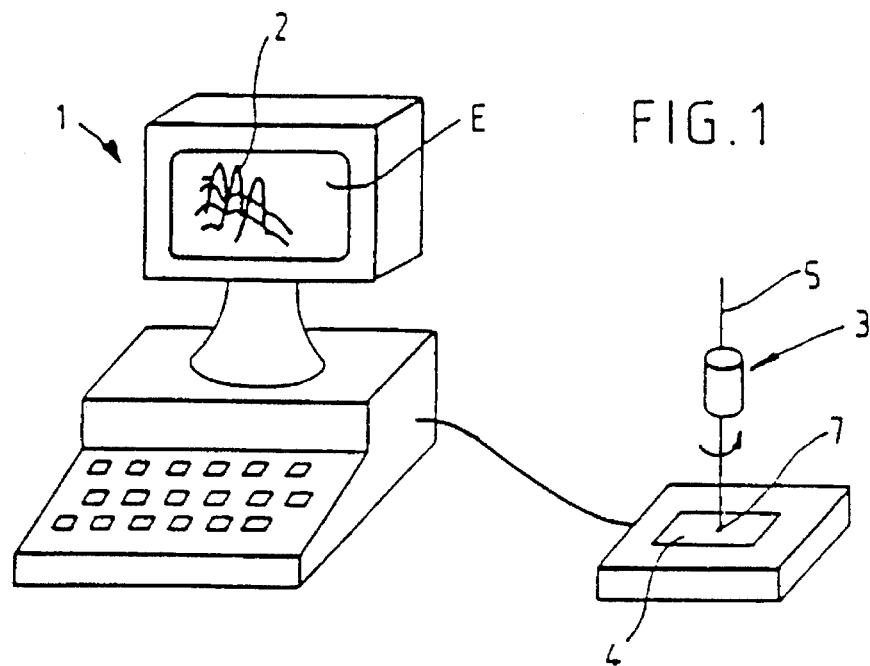
FIG. 1 is a schematic of the equipment of the invention.

FIG. 1 shows that the stamp manufacturing equipment of the invention comprises digitizing means 1 for an image 2. These means may consist of a storage associated with software allowing for instance to start from a photograph and to digitize an image by pixels or vectors. The image sensing from a photograph or a drawing may be by means of a scanner in known manner using commercial software. This initial two-dimensional component comprises contrast values allowing three-dimensional representation. Digitization can be carried out by a scanner or a camera and image acquisition can be carried out in color or in black-and-white.

The equipment of the invention allows interpreting the image, colors, dimensions, to change contrast, extracting the contours and anamorphosis.

Preferably, the equipment allows creating an image where there was none. Illustratively this image may be a drawing directly imagined by the artist illustratively having access to CAD (computer assisted drawing) software or to computer-assisted manufacturing software. Such software is commercially available.

Moreover the artist may create inverted, symmetric images or images mathematically transformed by any formula.

In one embodiment mode of the invention, the equipment also may include a printer allowing to plot the image on a sheet of paper. The image so obtained furthermore may evince definite scales. The image may be in black-and-white, color, it may be two-dimensional or be shown with shades allowing three-dimensional representation.

Also the equipment comprises engraving means 3 for the stamp 4. These means allow direct, three-dimensional engraving of the stamp. For that purpose the equipment includes means controlling the path of the engraving means. These engraving means 3 for instance may be a numerical-controlled milling machine 5. The invention is remarkable in that the image is sensed three-dimensionally and in that an engraving dot corresponds to each sensed value, said engraving dot being defined by three-dimensional space coordinates. Again, the engraving dot positioned at the space x,y,z coordinates and of which consequently the depth is controlled evinces a continuous and smooth path. The milled volume therefore is continuous, not the "ladder" type of the prior art resulting from stepwise milling.

Figure 3:
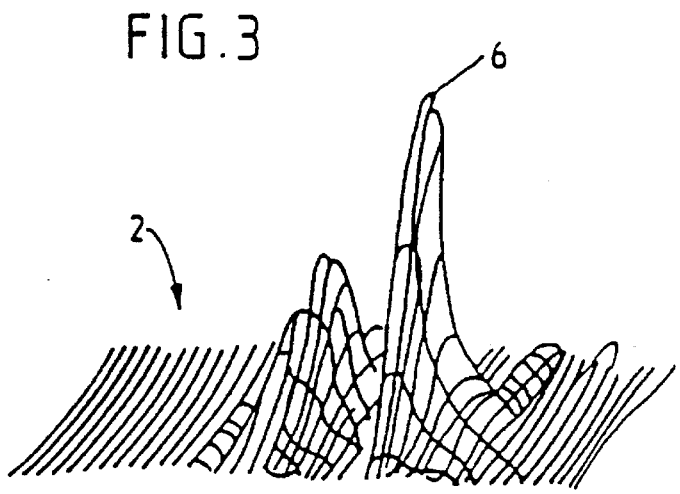
FIG. 3 is a schematic showing the transformation of a three-dimensional digitized image into a continuous surface.

FIG. 3 shows how the image is sensed. As shown, the image 2 is sensed along elevation contour lines 6, that is, continuous and smoothed elevation contour lines. In the invention, the end of the milling machine 3, namely the milling tip 7, follows a path corresponding to these elevation contour lines 6.

Stamps made of metal such as copper, steel, aluminum or of a hard plastic can be engraved.

Figure 2:
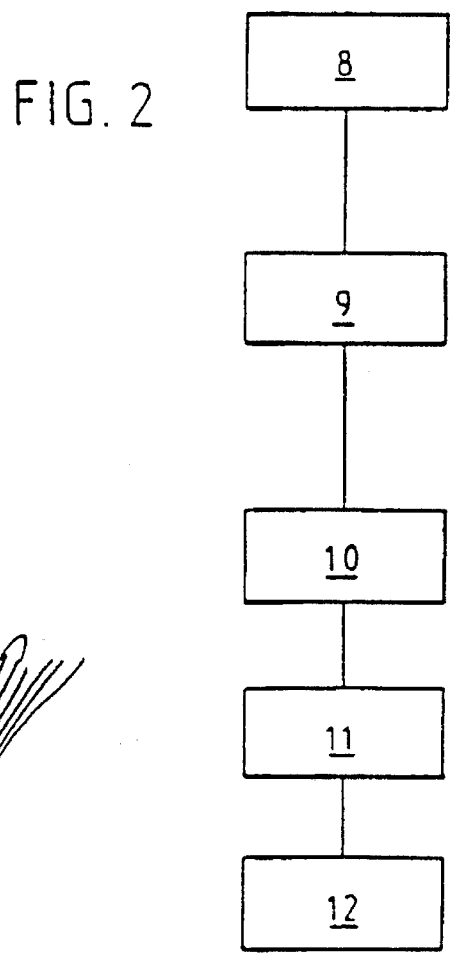
FIG. 2 is a schematic showing the various stages in a manufacturing method for a stamp of the invention.

FIG. 2 shows the method stages.

The first stage 8 consists in sensing the image digitally. Values are obtained in this manner which correspond to x-y coordinate dots and with shades of gray corresponding to the depth z of the desired engraving.

Using commercial software, the image values can be modified in stage 9. Accordingly it is possible to enlarge, reduce, symmetrically or homothetically transform the image. Moreover, the image is displayed on the screen E. The artist may have software with which to modify this image (stage 10). Accordingly the invention consists in digitizing the image, modifying it, and interpreting it.

Where desired this image in conjunction with the software may be printed by a printer.

Once the work of interpretation and creation is done, the values corresponding to the modified image may be memory-stored.

The values so stored in a file are fed to another computer fitted with software allowing creating a three-dimensional version of this image using those data. In the next stage 11, the 3D image is transformed into curves (FIG. 3). These curves form a "grid" defining the path of the engraving path. For that purpose the curve data are processed by software to determine the path of the engraving tool or milling machine.

The stamp 4 is engraved by automation in stage 12. The invention is remarkable in that the stamp is engraved directly and continuously.

In accordance with the invention, any image may be created at a work station and/or the values of extant images can be digitized and/or images may be modified and then the corresponding values can be memory-stored. The previously stored images then can be picked up at another work station and a stamp can be engraved.

Moreover the invention is remarkable in that the data can be memory-stored at each stage of the method.

We claim:

1. A method for manufacturing an embossing stamp used to emboss wire cloths in the manufacture of watermarked paper, wherein values of an image are sensed and digitized, said values including positions of image dots and gray levels of these dots, wherein the improvement comprises the steps of associating a continuous three-dimensional surface with the digital image values and plotting elevation contour lines of this continuous surface, processing the elevation contour lines and deriving continuous control values for a path of an engraving tool, said path being continuous, and engraving the stamp in an automated manner.

2. A method as claimed in claim 1, wherein from the derived continuous control values, an image is reconstituted which is composed of dots evincing variable gray levels, in that this image is interpreted and in that a modified image and corresponding values of the modified image are thus derived.

3. A method as claimed in claim 2, wherein the modified image is printed.

4. A method as claimed in claim 3, wherein contrasts and genuine or false colors are digitized, made anamorphic and are interpreted.

5. A method as claimed in claim 4, wherein the digitizing stage and the engraving stage take place at different and well spaced time intervals.

6. A method as claimed in claim 1, wherein the digital image values are memory-stored.

7. A method as claimed in claim 1, wherein the values of the elevation contour lines are memory-stored.

8. A method as claimed in claim 1 wherein the values of an already extant image are sensed.

9. A method as claimed in claim 1, wherein an imaginary image is created.

10. A method as claimed in claim 1, wherein the image values are three-dimensional.

11. A method as claimed in claim 1, wherein the engraving path is made to correspond to the digital image values.

12. A method as claimed in claim 1, wherein the values of the pixel digital images are transformed into a grid of dots defined by x,y coordinates and altitude z, the dots being associated with the gray levels of the pixels.

13. A method as claimed in claim 1, wherein a continuous and smoothed surface is associated to the grid of dots (x, y, z).

14. A method as claimed in claim 1, wherein the contour curve is obtained by smoothing.

15. A method as claimed in claim 1, wherein the hues of the image (x, y, z) are modified by compression, expansion or by setting thresholds in view to exaggerate contrast.

16. A method defined in claim 1, wherein parts are made one with another of a selected quantity by rolling a ball of a selected diameter to achieve a new surface from an original one.

17. A method as claimed in claim 3 wherein contours of the initial image are caricatured.

18. Manufacturing equipment comprising means for sensing and digitizing image values which comprise positions of image dots and gray levels of the image dots, wherein the improvement comprises:

means for associating a continuous three-dimensional surface to the digital image values, means for plotting elevation contour lines of this continuous surface, means for treating the elevation contour lines to derive continuous control values for a path of an engraving tool, said path being continuous, and means for directly engraving an embossing stamp in an automated manner.

19. Equipment as claimed in claim 18, which includes image display means and where called for image printing means.

20. Equipment as claimed in claim 18, which includes means for modifying size and color of the image.

21. Equipment as claimed in claim 18, which includes an image-creation station and an engraving station that can operate independently of each other.

* * * * *